United States Patent
Topp (10) Patent No.: US 6,881,365 B2
(45) Date of Patent: Apr. 19, 2005

(54) EXTRUSION DEVICE AND METHOD FOR PRODUCING PLASTIC HOLLOW PROFILES HAVING AT LEAST ONE HOLLOW CHAMBER SPACE THAT IS FILLED WITH FOAM

(75) Inventor: Alfons Topp, Drensteinfurt (DE)

(73) Assignee: Veka AG, Sendenhorst (DE)

( * ) Notice: Subject to any disclaimer, the term of this patent is extended or adjusted under 35 U.S.C. 154(b) by 178 days.

(21) Appl. No.: 10/169,490

(22) PCT Filed: Dec. 18, 2000

(86) PCT No.: PCT/EP00/12882
§ 371 (c)(1),
(2), (4) Date: Aug. 19, 2002

(87) PCT Pub. No.: WO01/43939
PCT Pub. Date: Jun. 21, 2001

(65) Prior Publication Data
US 2003/0031816 A1 Feb. 13, 2003

(30) Foreign Application Priority Data
Dec. 18, 1999 (DE) .......................... 199 61 306

(51) Int. Cl.[7] .............................................. B29C 44/24
(52) U.S. Cl. .................... 264/45.9; 264/45.8; 264/46.6; 264/50
(58) Field of Search .................... 264/45.8, 45.9, 264/46.6, 50

(56) References Cited

U.S. PATENT DOCUMENTS

| | | | |
|---|---|---|---|
| 3,832,099 A | * 8/1974 | Berg | 425/4 C |
| 4,044,084 A | * 8/1977 | Phipps | 264/51 |
| 4,056,595 A | * 11/1977 | Bokelmann | 264/46.3 |
| 4,108,585 A | * 8/1978 | Proksa et al. | 425/89 |
| 4,225,378 A | * 9/1980 | Garrison | 117/27 |
| 5,286,320 A | * 2/1994 | McGrath et al. | 156/83 |
| 5,653,923 A | * 8/1997 | Spoo et al. | 264/46.1 |
| 5,665,286 A | * 9/1997 | Sulzbach et al. | 264/46.2 |
| 5,807,514 A | * 9/1998 | Grinshpun et al. | 264/46.6 |
| 5,942,173 A | * 8/1999 | Cole et al. | 264/46.6 |

FOREIGN PATENT DOCUMENTS

DE   OS 1959454   6/1971

\* cited by examiner

Primary Examiner—Allan R. Kuhns
(74) Attorney, Agent, or Firm—Milde & Hoffberg, LLP (57) ABSTRACT

In order to achieve an economical and trouble-free continuous extrusion of plastic hollow profiles having at least one hollow chamber that is filled with foam, the profile tool of an extrusion device is configured in the shape of a pistol. The profile tool comprises a pistol shaft (102) with a melt feed channel (166), connected to the melt discharge opening of the extruder (300) and which opens into a melt radial distributor channel (164) that surrounds the lance guide channel (150). The profile tool is also equipped with a pistol barrel (101) comprising a melt ring channel (162), which extends from the melt radial distributor channel (164) to the profile nozzle (160) and comprising a lance guide channel (150), which extends in a continuous manner from a lance inlet (152) to the profile nozzle (160).

13 Claims, 10 Drawing Sheets

EXTRUSION DEVICE AND METHOD FOR PRODUCING PLASTIC HOLLOW PROFILES HAVING AT LEAST ONE HOLLOW CHAMBER SPACE THAT IS FILLED WITH FOAM

BACKGROUND OF THE INVENTION

The invention related to an extrusion device for the production of plastic hollow profiles filled with foam, whose cross-section consists of at least one hollow profile section, with the following individual parts:

one extruder for the processing and supply of a plastic melt;

one profile tool connected to the extruder at one melt inlet opening carrying the melt and including a profile nozzle with at least one hollow profile nozzle section;

at least one foam lance, which, at least partly, is arranged inside a melt radial channel leading to the profile nozzle and coaxially to a discharge direction of the plastic hollow profile coming out of the profile nozzle.

A method and a device for the continuous extrusion of endless profiles with a coating of thermo-plastic synthetic material and a foam core is know from DE-OS 1 959 454. In a profile tool of an extruder for the production of a coated profile with a hollow space, a mixture carrying pipe is arranged, through which a reaction mixture can be injected in the hollow space in order to form a foam core. The plastic profile is subsequently sent to a cooling and calibrating system. The mixture supplying pipe reaches into the hollow space of the calibrating device. The nozzle of the mixture supplying pipe lies in an area above the profile wall, in which the temperature of the coated profile is reduced to at least 100° C., in particular from 20° up to 50° C. The length of the mixture supplying pipe can be adjusted in order to set the axial position of the nozzle. However, a disadvantage in this is that the reaction mixture injected through the nozzle can flow back to the hot area of the coated profile. The hereby proposed encircling of the nozzle with a seal ring sealing the ring space between the mixture supplying pipe and the coated profile, does not only imply additional costs but is also troublesome, seeing that the accumulating foam front lies directly in front of the injection nozzle. To glue the seal ring, the entire profile tool would have to be taken apart. The firmly glued mixture supplying pipe can only be removed only if the coated profile pipe is destroyed. The known method and the known device cannot ensure a trouble-free and unsupervised operation.

SUMMARY OF THE INVENTION

Therefore, the principal object of the present invention is to provide an improved extrusion device to achieve an economical, trouble-free arid continuous extrusion of plastic hollow profiles with at least one hollow chamber that is filled with foam.

This object, as well as other objects which will become apparent from the discussion that follows, are achieved, in accordance with the present invention, by providing a profile tool which is configured in the shape of a pistol and which comprises:

an extruder for the processing and supply of a plastic melt; and a profile tool connected to the extruder at a melt inlet opening carrying the melt and including a profile nozzle with at least one hollow profile nozzle section.

The guiding axis of the lance and the rail of the plastic hollow profile in the cooling and calibrating system are slanted downwards, opposite a horizontal line, at an angle α in the range of 1 to 10°, in the discharge direction.

Particularly advantageous is an embodiment in which the foam lance, with its outer circumference, maintains a radial spacing from the outer circumference of the extruder.

The "radial spacing" should be taken with respect to the extruder's cental axis and designates the distance between the extruder and the foam lance, in a section-view, vertically to the extruder's central axis.

Through this radial spacing, the foam lance is freely accessible and can be inserted into the profile tool, from behind, in the lance inlet opening. In this way, the foam lance can be inserted, adjusted and/or taken off also during the operation of the extrusion device, without having to remove the profile tool.

In order to counteract the flexion, a guiding rail can be provided, along which the foam lance can slide and be axially adjusted. The partial area of the foam lance protruding from behind the profile tool can lean against the guiding rail, being supported from here. A sliding lining on the guiding rail favors the axial movement of the foam lance.

This guiding rail can be directly placed on the extruder.

Special advantages are achieved thanks to the fact that the lance guiding axle and the rail of the plastic hollow profile, in the cooling and calibrating system, are slanted downwards, opposite a horizontal line, in an angle α=1–10°, in the discharge direction.

An angle of 1 ... 1.5° has proved itself to be particularly suitable. With such an inclination, the problem due to the grip of the foaming fluid to the partition of the plastic hollow profile can be overcome so that the fluid can flow in a direction, away from the tip of the foam lance.

However, the inclination is so little that only a very slow flowing speed of the foam substance is achieved. This ensures that the foam can still reach the area of the cooling and calibrating system and that no foam substance moves in the discharge device before the beginning of the foam reaction.

Preferably, the guiding rail is placed in the same angle α, compared to the horizontal line, as the lance leading axle, so that the guiding rail and the lance leading axle are coaxially arranged.

In a further embodiment, the cooling and calibrating system features a roll calibrating device, in which the plastic hollow profile is supplied with pressure from all sides by means of several rolls. The advantage in this is that the friction forces to be overcome are significantly weaker than those faced by the extruder of the extruded plastic hollow profile through the calibrating diaphragm, which makes the removal of the profile easier.

In consideration of the above-mentioned disadvantages of the method presently known in the art, it is a further principal object of the present invention to achieve an economical, trouble-free and continuous extrusion of plastic hollow profiles with at least one hollow chamber that is filled with foam.

This object, as well as further objects which will become apparent from the discussion that follows are achieved, in accordance with the present invention, by means of a method for producing plastic hollow profiles with at least one hollow chamber that is filled with foam, which comprises the following steps:

(1) extruding a plastic hollow profile with with a discharge speed VA;

(2) cooling the plastic hollow profile as it moves forward at discharge speed VA;

(3) directing a foam lance into the hollow chamber, with the foam lance tip positioned in an area of the plastic hollow profile, the temperature of the section of the plastic hollow profile surrounding the foam lance tip being cooled at a foam temperature TA;

(4) injecting a reactive mixture made up of two foaming components into the hollow chamber with a foam substance temperature TS and foaming in a plastic isolating foam body by means of the continuous recalibration and recooling of the outer side of the plastic hollow profile.

According to the invention, the plastic hollow profiles with at least one hollow chamber that is filled with foam, said method comprising:

(1) extruding a plastic hollow profile with a discharge speed VA;

(2) cooling the plastic hollow profile as it moves forward at the discharge speed VA;

(3) directing a foam lance into the hollow chamber, with the foam lance tip positioned in an area of the plastic hollow profile, the temperature of the section of the plastic hollow profile surrounding the foam lance tip being cooled at a foam temperature TA;

(4) injecting a reactive mixture made up of two foaming components into the hollow chamber with a foam substance temperature TS and foaming in a plastic isolating foam body by means of the continuous recalibration and recooling of the outer side of the plastic hollow profile;

the improvement wherein the plastic hollow profile extruded out of the profile tool is taken off on a track which is slanted downward with an angle α in the range of 1–10° with respect to the horizontal.

In this way, one achieves that the injected reaction mixture flows away from an injection nozzle and the foam front starts to form only at a distance from the foam lance tip. This prevents the back flowing of the reaction mixture in the hotter area of the plastic hollow profile and, also effectively hindering any sticking of the foam lance tip.

This advantageous method can be further improved by choosing a reaction mixture that, given the temperature of the foam substance in the lance tip, can form plastic foam with a reaction time of 10 . . . 20 s.

Preferably, polyoles (polyalcohol) with isocyanates are injected as foam substances. The reaction of the mixture made up of the described reaction components produces a polyurethane foam with plastic isolating foam bodies evenly filling the hollow chamber.

The invention also concerns an expandable plastic profile with a profile wall, whose cross-section consists of at least one hollow chamber. In general, with the devices and methods from the known state of the art, the plastic hollow profiles are filled with foam, following the general principle that they must be optimized in their geometry only for their later intended purpose, e.g. for the dipping of a window frame or window casement. If an expanding plastic foam is introduced into the hollow space, the pressure in the hollow space increases, especially when injecting reaction mixtures producing hard-foam, so much that it causes a deformation of the profile wall around the hollow space. These deformations must be eliminated by costly downstream calibrating devices, which is only possible within limits, because, by the time the calibrating devices reach the plastic hollow profile, the latter will have already hardened and will be, by that time, heavily plastically deformed.

Another object of the present invention is to provide a foamable plastic hollow profile of the mentioned type, which prevents the deformation of the geometry caused by the internal pressure in the hollow chamber.

This object is achieved by having the hollow chamber lined with the foam body auxiliary wall, laying at a distance from the profile wall, along at least one part of its cross-section circumference, whereby the foam body auxiliary wall and the profile wall are joined to each other by at least one bridge.

The foam substance is injected in the hollow chamber defined by the foam body auxiliary wall and expands with the beginning of the chemical reaction. Once the hollow chamber has been filled, the pressure rises due to the forces exerted on the foam body auxiliary wall, which, sometimes, can cause the plastic deformation of the foam body auxiliary wall. In this way, the inner pressure is reduced and a pressure effect on the actual profile walls, especially those in the visual area of the finished plastic hollow profile, is weakened.

For a full understanding of the present invention, reference should now be made to the following detailed description of the preferred embodiments of the invention as illustrated in the accompanying drawings.

DESCRIPTION OF THE PREFERRED EMBODIMENT

The preferred embodiments of the present invention will now be described with reference to FIGS. 1–10 of the drawings. Identical elements in the various figures are designated with the same reference numerals.

Figure 1:
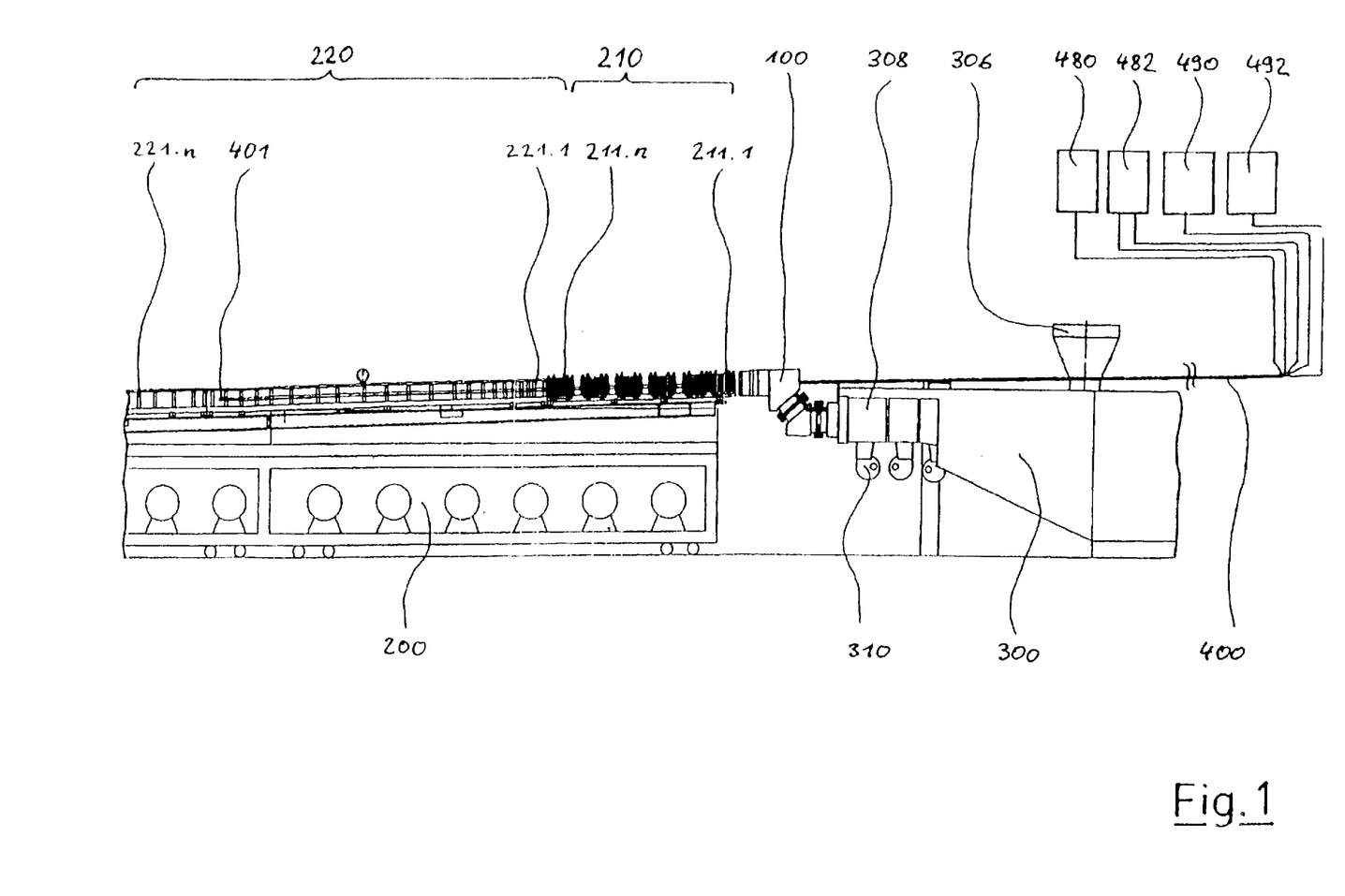
FIG. 1 is a side view of one section of the extrusion device according to the invention.

FIG. 1 shows an extrusion device according to the invention. An extruder 300 is designed to prepare a foam melt and press it by means of a profile tool 100. The extruder 300 consists of at least one cylinder 308 warmed on hot bands and at least one worm arranged on the cylinder 308 for the plasticizing of the powder or granulate loaded on a filling cone.

For the production of plastic hollow profiles made of PVC, a double worm extruder 300 is used, with a worm diameter D=130 mm and a worm length 22D 2860 mm, equal to 22 times the worm diameter. For the processing of PVC, it is preferred to use opposing double worm extruders or specially adjusted single worm extruders. Their advantage is related to the fact that the plastic can be plasticized and processed with an higher flow rate and, therefore, remains in the extruder only for a short time, so that the risk of the thermal deterioration of the plastic can be reduced. Given that, especially in double worm extruders, a big amount of heat is produced in the melt through the dissipation energy, in the front area the extruder 300 can also be equipped with air coolers 310 in order to prevent the over-heating of the cylinders and of the plastic melt contained in them.

In front of the tip of the extruder 300 there is a profile tool 100 in which the melt forms a profiled plastic strand, which comes out of the profile tool 100 from a profile nozzle. Inserted into the profile tool 100 there is a foam lance 400, which is connected to the following supply devices:

a compressed air system 480 a cooling-water circulating system 482 with a water flow both forwards and backwards;

foam substance supplying tanks 490, 492.

Two reactive components, separated from each other, flow out of the foam substance supply tanks 490, 492, through the foam lance 400 and are mixed together by a mixing head coming out of the foam lance tip 401, reacting with each other, whereby forming a plastic foam.

When it is necessary to fill not only one hollow chamber but several hollow chambers of the plastic hollow profile with foam a separate foam lance is sent to each hollow chamber. The foam lances, whether there is one, two or many of them, can be connected to common supply devices 480, 482, 490, 492.

A fundamental characteristic of the invention is that the foam lance tip 401 ends in an area of the cooling and calibrating system 200 in which the profile is already cooled down at a foam temperature TA of about 30° C. At this temperature, the extruded plastic hollow profile is so stable in its shape that the swelling of the profile walls due to the inner pressure caused by the foaming is prevented. Moreover, the plastic hollow profile is cooled from outside by the cooling water from the cooling and calibrating system 200.

The cooling of the foam substance is ensured by the water flowing inside the foam lance 400 which prevents the overheating of the foam lance 400 and of the foam substance directed to it.

The length of the foam lance 400 is determined in a way that the foam lance can be pushed forward inside the plastic hollow profile so much that the foam lance tip 401 lies in the area of the foam temperature, while a rear end of the foam lance 400 is led inside the lance guide channel 150 of the profile tool 100. In the embodiment showed in the figures, the foam lance 400 is about 6 m long. In the same way, the foam lance 400 lays only in the lance guide channel 150 of the profile tool 100. The end of the foam lance 400 sticking out of the lance guide channel 150 is unsupported, this resulting in great flexion. Depending on the thickness of the wall in the plastic hollow profile, on the size of the hollow chamber to be filled with foam, etc., the point in which the foam lance tip 401 is to be positioned lies between 3 and 5 m before the profile tool 100. In order to counteract the flexion, a guiding rail can be placed on the extruder. Preferably, the guiding rail will be put in place with the same angle a, compared to an horizontal line, as the lance guiding axle 154, so that the guiding rail and the lance guiding axle 154 are coaxially arranged. The partial area of the foam lance protruding from behind the profile tool can lean against the guiding rail, being supported from here. A sliding lining on the guiding rail favors the movement of the foam lance 400.

Sensors are arranged on the foam lance tip 401 in order to control the pressure and temperature ratio in the place of the foam substance injection. In particular, the foam lance tip 401 also includes an ultra-sound sensor to set a distance between the foam lance tip 401 and the foam body forming inside the plastic hollow profile and ensure continuous operation. The foam substance components mixed together and coming out of the mixing head of the foam lance 400 react to properly set operation parameters of the extrusion device, in a place located about 500 mm away from the foam lance tip 401. This distance prevents the foam lance tip 401 from clogging.

In the immediate vicinity of the profile nozzle 160 of the profile tool 100, a cooling and calibrating system 200 is arranged. The profiled elastic strand coming out of the profile tool in a plastically deformed status is cooled in the cooling and calibrating system 200 at a foam temperature below the temperature at which plastic softens. In this way, the change in shape due to the contraction of the cooling plastic are also resisted, in order to obtain, at the end of the cooling and calibrating system 200, a plastic hollow profile of the desired geometric final size.

The cooling and calibrating system 200 is made up of a cooling and calibrating system 210 and a connected cooling and calibrated system 220.

Inside the cooling and calibrating systems 210, 220 there are several calibration diaphragms 221.1, . . . , 221.n arranged one next to the other and they can be up to 60 in number.

The calibrating diaphragms 221.1, . . . , 221.n have the task to properly shape and calibrate the still warm and plastically deformable plastic hollow profile 50 coming out of the profile tool 100, during the cooling process, in selected areas of the outer outline. The contraction of the plastic hollow profile 50 due to cooling is also counteracted by arranging vacuum tanks 211.1 . . . 0.211.n, in the area of the cooling and calibrating system 210, to which an under pressure is applied in order to obtain a difference in pressure between the inside of the hollow profile 50 and its outer outline. Thanks to this pressure gradient, the outer outline of the hollow profile can lean against the calibrating diaphragms 221.1, . . . , 221.n to the extent required.

Figure 7:
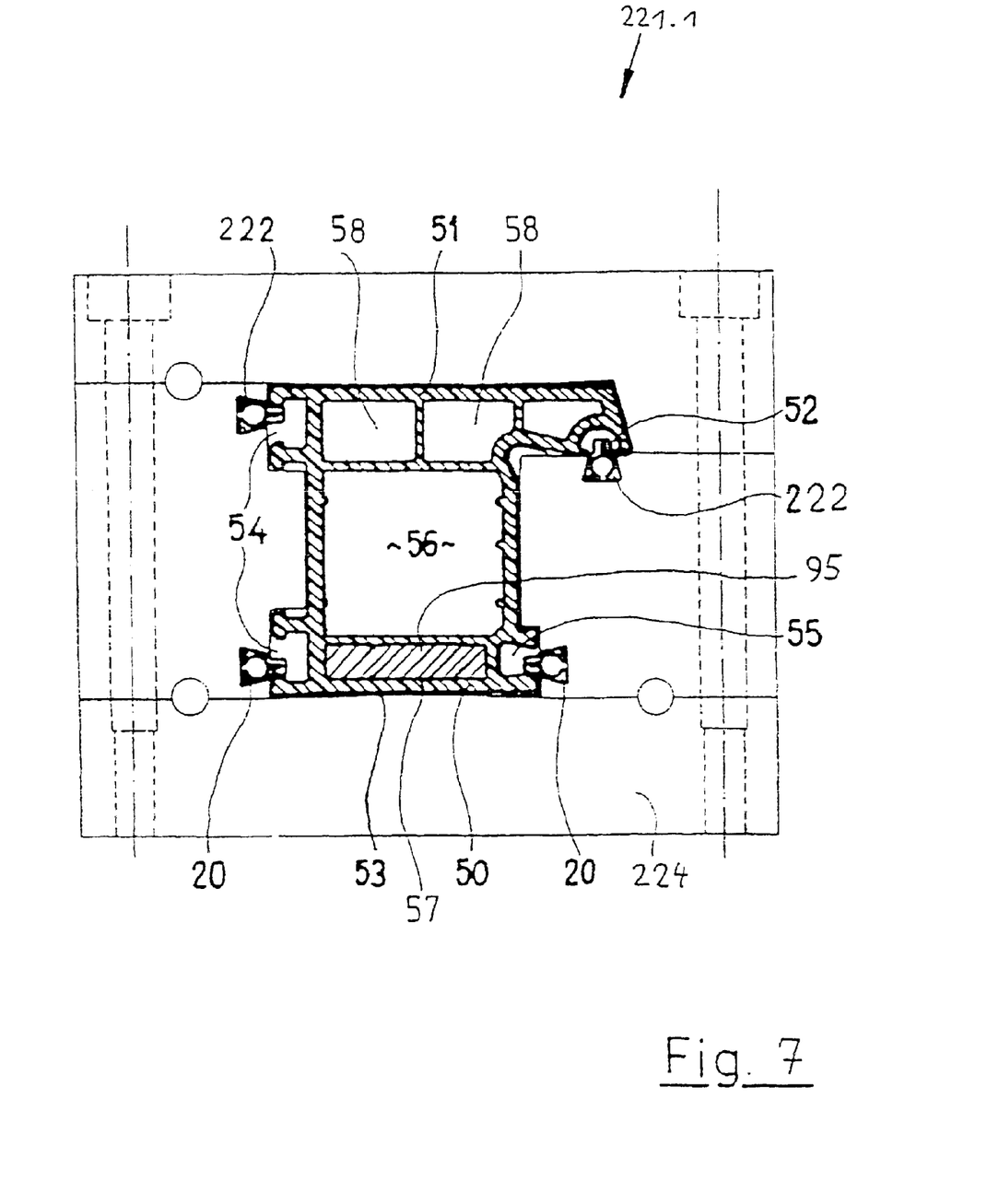
FIG. 7 is a calibrating diaphragm for the plastic frame profile according to FIG. 5b.

FIG. 7 shows a calibrating diaphragm 221.1, with a profile 50 inserted in it. Each calibrating diaphragm can be produced in one piece from one single calibration body 224, in which a fitting profile cross-section slot is provided, which is determined by the relevant cross-section configuration of the plastic hollow profile 50 to be produced. This can also include more parts and be disassemblable, so that the preparation of the edges of the profile cross-section slot can be facilitated. The profile cross-section slots of the calibrating diaphragms 221.1, . . . , 221.n are formed according to the cooling ratio of the profile. Therefore, the first calibrating diaphragms 222.1, . . . are pre-loaded against the profile cross-section slot i.e. they bend inside the profile cross-section slot. Inside the profile cross-section slot, the short calibrating body 232 is directed to selected spots in order to form profile sections like grooves 52, 54, 55, for which, a particularly accurate dimensional precision must be reached.

Behind the cooling and calibrating system 220, a non-displayed transport device is arranged, which continuously conveys the produced endless profile at a discharge speed VA.

Behind the transport device, a cutting machine is provided, in which the finished plastic hollow profile strand is cut to size and sent to a stacker.

Figure 8:
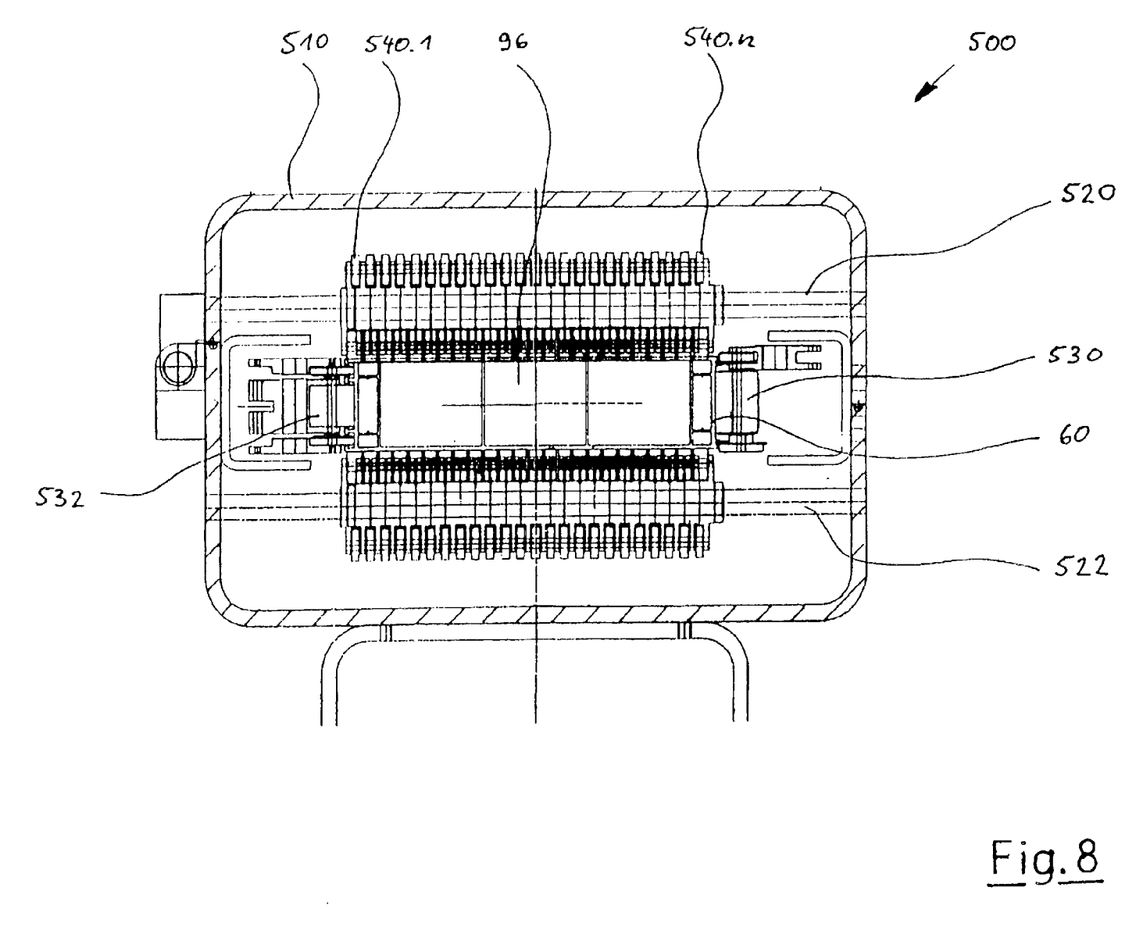
FIG. 8 is a cross-sectional view of a roll calibrating device.

In addition to the re-calibration and cooling system 220 or in its place, a roll calibrating system 500, like the one shown in FIG. 8, can be provided in the cooling and calibrating system 200. In a closed casing 510, two parallel axles 520, 522 are arranged one on top of the other. On axles 520, 522, several rotating calibrating rolls 540, . . . , 540.n are arranged. Along the roll calibrating device 500, several sets of such calibrating rolls 540.1, . . . , 540.n are arranged, both at the level of the upper axle 520 and also at the level of the lower axle 522. In the extrusion direction, the calibrating rolls 540.1, . . . , 540.n are arranged, in a position that is offset from the adjoining roll sets, so that the entire area of the upper surface of a plastic hollow profile 60 inserted in the roll calibrating device 600 can be touched by the calibrating rolls 540.1, . . . , 540.n. The foam chamber 96 of the plastic hollow profile 60 is sized approximately 65×55 cm. Through the calibrating rolls 540.1, . . . , 540.n, the long walls of the plastic hollow profile 60 are formed as to achieve the desired final size. In this way, changes in shape in the area of the foam core 96 are also counteracted. The side walls of the plastic hollow profile 60 are also supplied with pressure coming out from lateral calibrating roll sets 530, 532. In the calibrating roll sets 530, 532, time after time, wide rolls get through the entire continuous side wall of the plastic hollow profile 60, while thinner rolls take over the profiling of the remaining profile. In the same way in which the upper and lower calibrating rolls 540.1, . . . , 540.n are arranged on the long side of the profile, the lateral calibrating roll sets 530, 532 are also arranged one behind the other.

Figure 2:
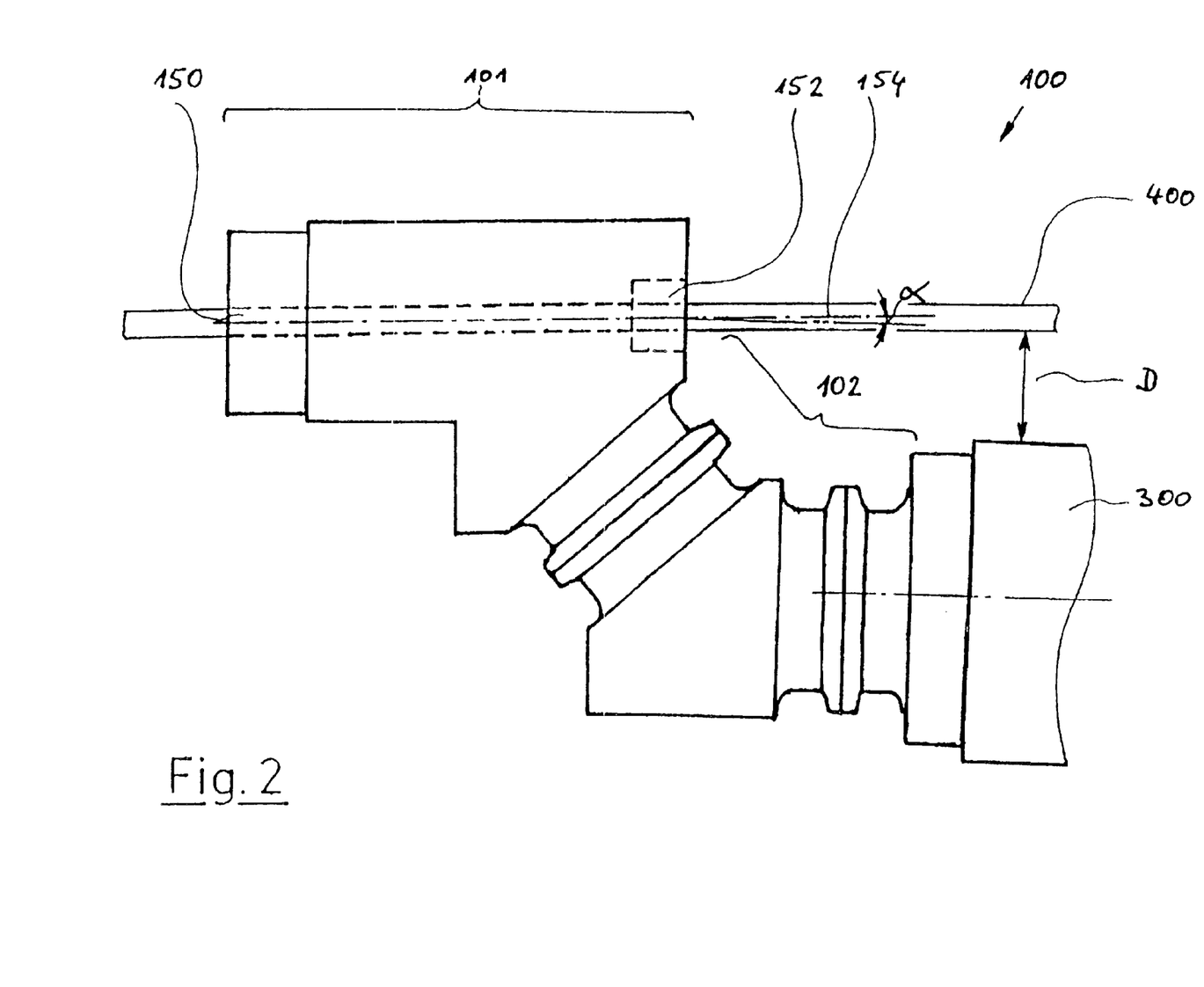
FIG. 2 is a side view of a section of the device of FIG. 1 having one profile tool with one inserted foam lance.

As FIG. 2 in particular shows, the pistol-shaped profile tool 100 according to the invention is mainly made up of one pistol barrel 101 and one pistol shaft 102.

Inside, the pistol barrel 101 consists of a continuous lance guide channel 150. At the back of the pistol barrel 101 which is opposite the profile nozzle 160 the lance channel 150 is extended to a lance inlet opening 152, in order to facilitate the inserting of the foam lance 400 in the lance guide channel 150 of the profile tool 100. Between the outer side of the extruder 300 and the circumference of the foam lance 400, in the implementation example of the profile tool 100 shown in FIG. 2, a distance D is provided so as to form an air space between the extruder 300 and the foam lance 400. In this way, the foam lance is axially freely movable.

The lance guiding axle 154 is slanted downwards at an angle α, with respect to the horizontal line, in the discharge direction of the plastic hollow profile. In this way, the fluid, which is injected in a hollow profile nozzle section through the foam lance 400, flows way from the foam lance tip 401 with a lower flowing speed, so as to prevent the sticking and/or clogging of the foam lance tip 401 due to foaming.

The pistol shaft 102 is directly attached to the extruder 300 and provides a foam carrying connection with the pistol barrel 100.

Figure 3:
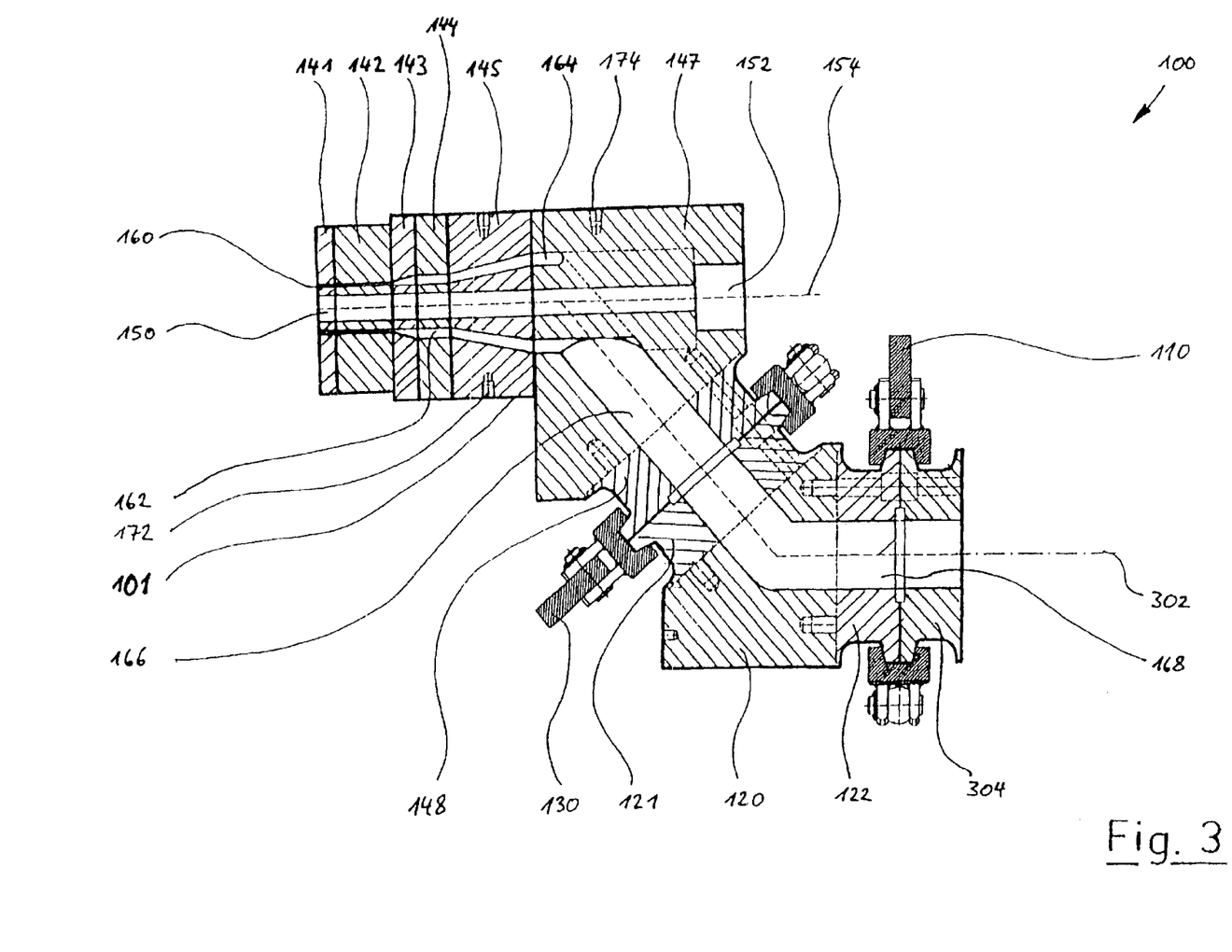
FIG. 3 is a cross-sectional view of the profile tool of FIG. 2.

As shown in FIG. 3 in particular, inside the pistol shaft 102, a melt feed channel 166 is located. This stretches itself from a melt inlet opening 168 up to a radial melt distribution channel 164. The melt feed channel 166 is doubly angled, so that the melt is diverted from the level of the extruder axle 302.

The middle axle of the pistol shaft 102 is lifted about 300 mm against the extruder axle.

In the implementation form shown in FIG. 3, the pistol shaft 102 comprises a transmission block 120 with a coupling ring 122 in the area of the final side. In the transmission block 120, the melt is conveyed out of the extruder axle 302.

By means of a ring tightening element 110, the coupling ring 122 is connected, to withstand compression, with one compatible extruder coupling ring 304. Through an additional ring tightening element 130, the coupling ring 121 is connected to a coupling ring 148 of a distribution block. The joining of the single components with coupling rings 148, 121, 133, 304 and ring tightening elements 110, 130 allows the easy manufacture of the angled melt feed channel 166 laying inside.

The melt feed channel 166 flows into a radial melt distribution channel 164. When looked at in a cross-section perpendicular to the lance guiding axle 154, the radial melt distribution channel 164 divides the flow passage of the melt, leads it round the lance guide channel 150 and rejoins the flow passage beyond the lance guide channel 150, as known from spiral distributors in the blower heads for foil extrusion. At the front end of the distribution block 147, the radial melt distribution channel 164 is ring-shaped. The circumference of the radial melt distribution channel 164 can have the form of circular rings; however, it can also be moved closer to the circumference of the plastic hollow profile to be produced, and also, for example, have a rectangular form. Moreover, in the central area of the pistol shaft 102, the melt is deviated from the direction of the melt feed channel in the direction of the lance leading axle 154.

In order to optimize the melt current and reduce the pressure in the melt, a first reducing plate 145 is located on the distribution block 164. The ring channel in the reducing plate 145 flows concentrically; this means that the width of the ring channel reduces itself; at the same time, the ring channel entirely narrows, taking on the shape of a funnel. In this way, the melt flowed into ring channel is, in the first place, lowered in pressure and, secondly, it is moved closer to the final displacement of the profile nozzle. In a first flow channel plate 144, a coaxial ring channel is inserted so as to from a laminar current.

The implementation example of a profile tool 100 shown in FIG. 3 includes an additional reducing plate 142 and an additional flow channel plate 142. The end creates a nozzle plate 141, in which a profile nozzle 160 is inserted, whose development determines the form of an extruded plastic hollow profile.

In order to make up for heat losses, the profile tool 100 is tempered on hot pipes 172, 174 and/or non-displayed heating bands.

Figure 4:
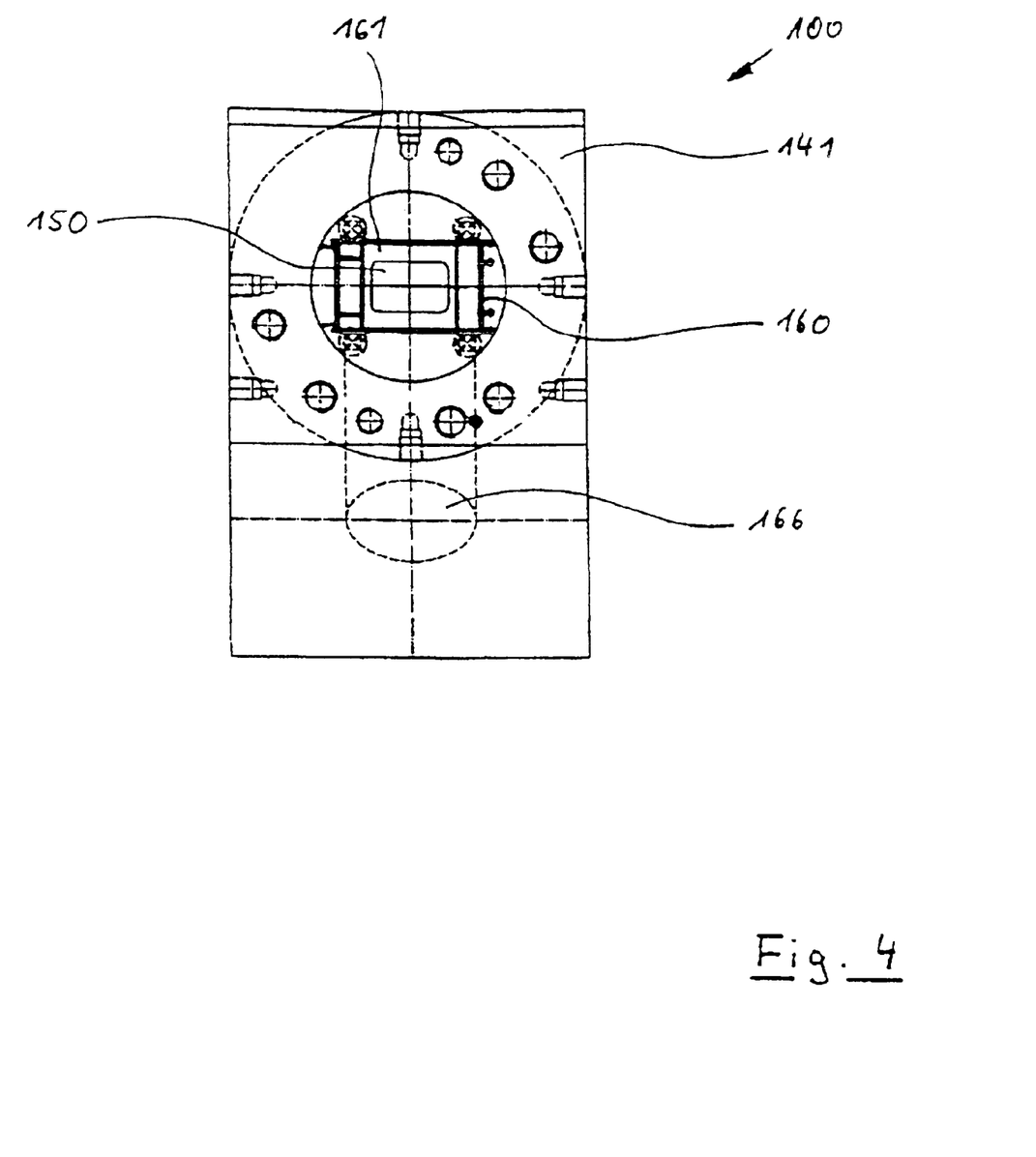
FIG. 4 is a front view of the profile tool of FIG. 2.

FIG. 4 shows the profile tool 100 in a top view on the nozzle plate 141 with the profile nozzle 160. A hollow profile nozzle section 161 of the profile nozzle 160 is arranged so as to encircle the lance guide channel 150. The lance guide channel 150 comprises a rectangular cross-section with rounded corners.

In the profile tool 400, at least one foam lance 400 is inserted for each hollow chamber of a profile to be filled with foam. The cross-section of the foam lance 400 is displayed in FIG. 6. The foam lance is produced out of an AlMgSi forging alloy, like, for example, the type 6060 (AlMgSiO,5) or 6005 (AlMgSiO,7), by means of extruders.

Figure 6:
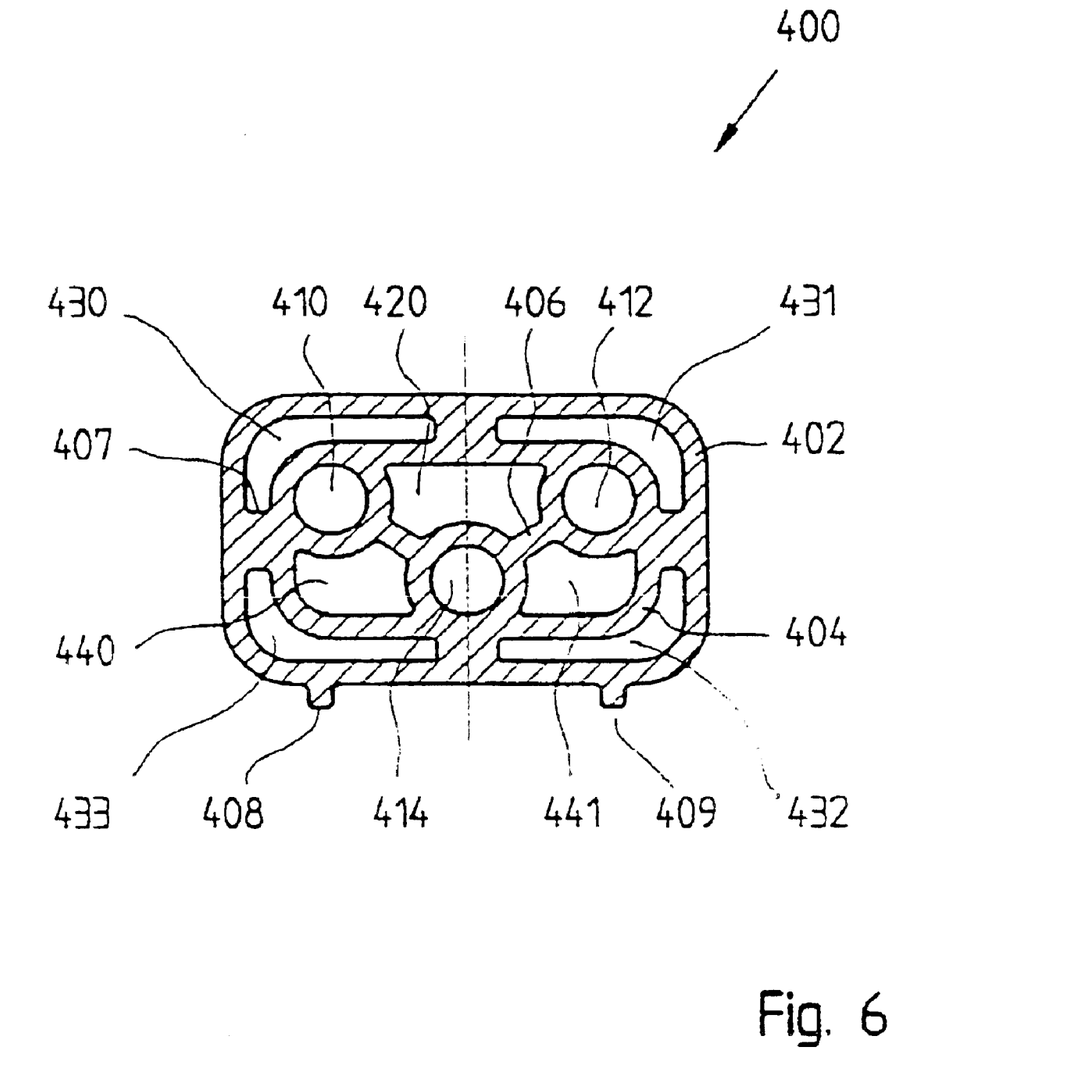
FIG. 6 is a cross-sectional view of a foam lance.

The cross-section is mainly made-up of an outer wall 402 and an inner wall 404 that are joined together by bridge 407. Moreover, inside there are several conduits 410, 412, 414, which either lean against the inner wall 404 or are, sometimes, integrated in it. Conduits 410, 412, 414 are connected to each other by means of a distribution bridge 406 in order to increase the flexural rigidity for the foam lance 400. The connection of walls 402, 404 and conduits 410, 412, 414 via bridge 406, 407 create a high number of closed hollow profile sections in the profile cross-section. These are useful for the transmission of fluids and gasses and the insertion of electric cables.

In the given implementation example, the four hollow profile sections enclosed at the angular sides between outer wall 402 and inner wall 404 are joined together like water back-flow pipes 430, 431, 432, 433, through which the cooling water can flow in the cooling-water circulating system 482, which is directed up to the lance tip 401 by means of the embedded water flow pipe 414. The upper conduits are used as foam substance pipes 410, 412, through which both foam substance components, separated from each other, are led from the foam substance supply tanks 490, 492 to lance tip 401.

Another cross-section slot serves as compressed air piping 420. The compressed air comes out little before the mixing head on the foam lance tip 401, by means of at least one compressed-air outlet and has the task to wash the foam lance with gas and cool it, as well as move the existing air to a hollow chamber to be filled with foam of a plastic hollow profile.

In order to cause the cooling of the wall of the hollow chamber also from inside and, in this way, obtain a faster cooling of the plastic down to the foam temperature, cooled gasses like carbon dioxide or nitrogen can also be used in place of or in addition to compressed-air.

Seeing that the foam lance 400 bends due to its great length, and cannot be directed inside a hollow chamber of the extruded plastic hollow profile with freedom of touch, the foam lance 400 is fitted with support bridges 408, 409 on its bottom side. By means of the coaxial support bridge, the foam lance 400 leans against a wall of the plastic hollow profile, when the extrusion device operates. The sliding between the foam lance 400 and the plastic hollow profile is facilitated by the thin sliding bridge 408, 409.

The compressed air can also come out from the non-displayed outlet nozzle and form an air cushion against the wall of the plastic hollow profile in order to facilitate the sliding between the foam lance 400 and the plastic hollow profile. If compressed-air is blown between the sliding bridges 408, 409, the foam lance 400 can be lifted with a thin air cushion from the underlying wall of the plastic hollow profile.

An additional hollow space in the foam lance 400 serves as cable channel 440 to direct signals from the sensors on the lance tip 401 to a supervising system for the extrusion direction.

An additional hollow space can be used as ventilation conduit 441 in order to prevent the formation of excessive pressure due to the expansion of the foam in the hollow chamber.

Figure 5A:
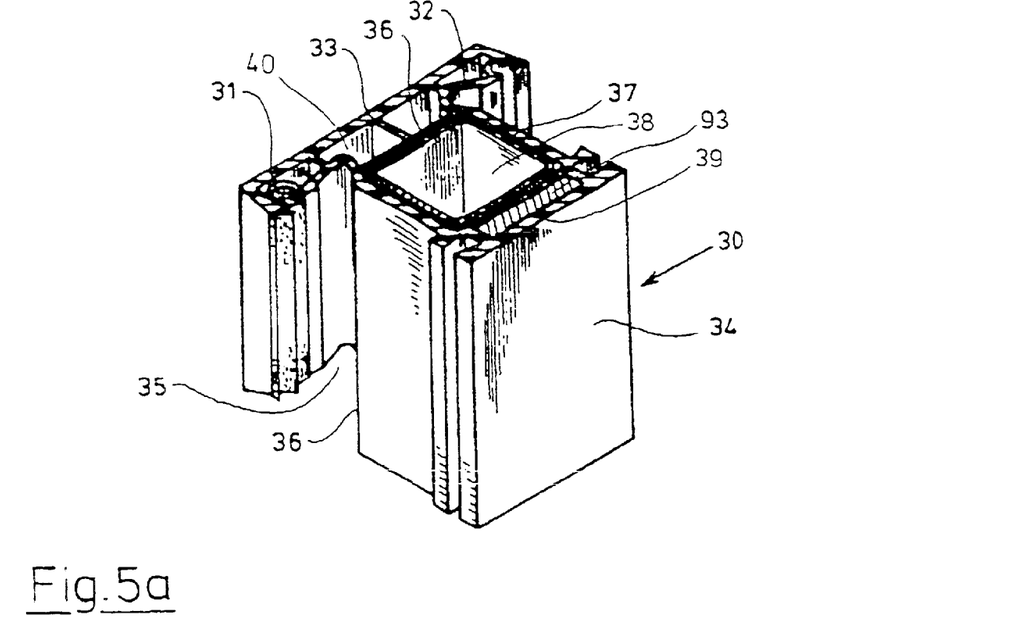
FIG. 5a is a perspective view of a plastic window sash profile produced with the extrusion device according to the invention.
Figure 5B:
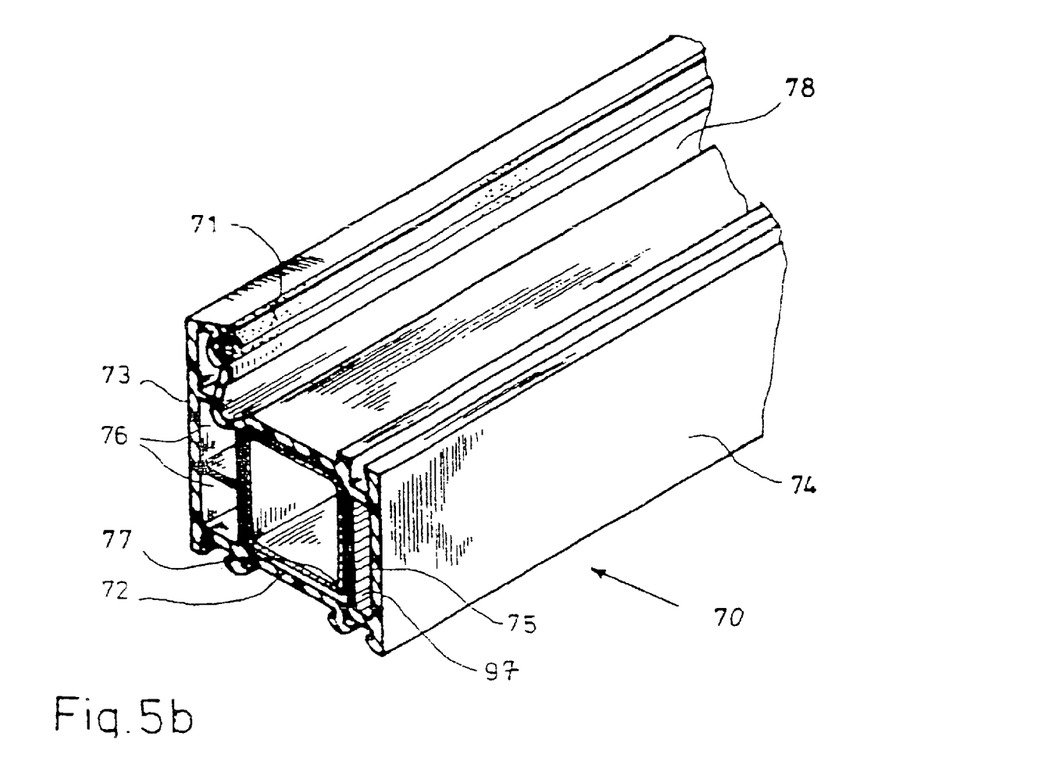
FIG. 5b is a perspective view of a plastic window frame profile produced with the extrusion device according to the invention.

FIGS. 5a and 5b show selected plastic hollow profiles, which can be produced with the extrusion device according to the invention.

FIG. 5a shows the profile of plastic-windows sash. It consists of a sashes outer profile 33 and a sashes inner profile 34. It includes a sashes outer profile slot 35 and a sashes inner profile wall 36. Inside the sashes inner profile 34, 38 refers to a frame chamber. In the frame chamber 38, a sashes metal profile 37 is inserted. The sashes inner profile 34 also includes a hollow chamber 39. The hollow chamber 39 differs from the humidity leading chamber of the outer profile marked with 40 in that it is fitted with no stiffening middle-walls separating the chamber, because inside the hollow chamber 39, a plastic isolating foam body is arranged, marked with 93, having warming and sound-isolating properties and, furthermore, strengthening the sashes inner profile 34 so much that, as already described, middle-walls can be done away with. Moreover, for one glass plate to be inserted, sashes gasket profiles, marked with 31 and 32, are provided on the sashes outer profile.

FIG. 5b shows a plastic window-frame profile 70. It consists of a frame outer profile 73 with humidity lead chamber 75. A frame inner profile 74 is connected to the frame outer profile 73. In the hollow chamber 75 of the frame inner profile 74 a frame metal profile is directed, marked with 77. Moreover, in a corresponding slot, a frame gasket profile 71 is tightened to frame outer profile 73. The frame inner profile 74 is filled up, in its hollow chamber 75, with the already mentioned plastic isolating foam body 97.

Figure 10:
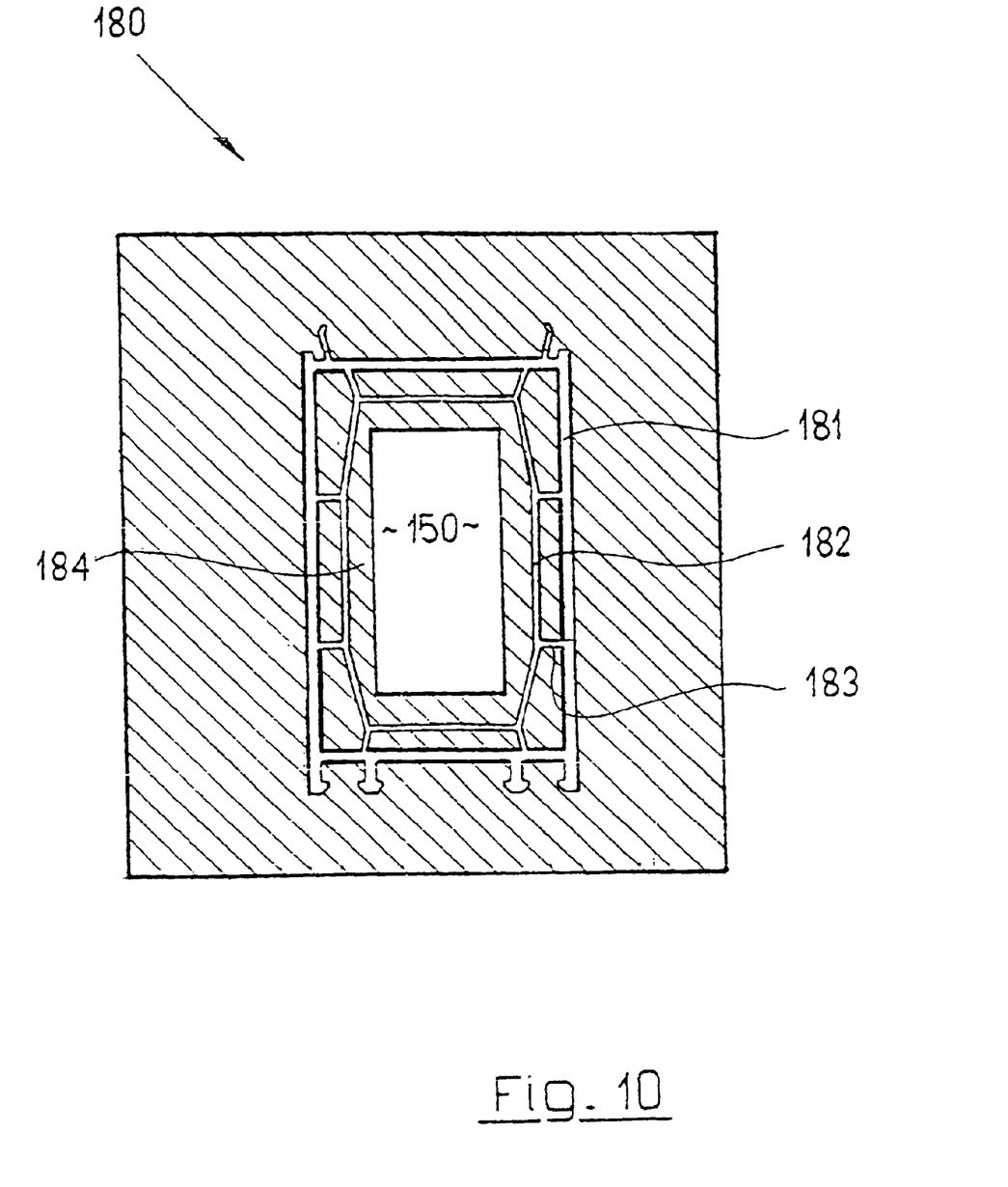
FIG. 10 is a top view of a profile tool.

The profile tool 180 displayed in FIG. 10 consists of at least:
a profile wall slot 181, which, in the plastic hollow profile, encloses a core area 184 for the formation of at least one hollow chamber; and
a foam body auxiliary wall slot 182 inserted in the core area 184, which is located at least along one part of the profile wall slot 181, distanced from it, and is connected with it by at least one connecting bridge 183.

On this tool, almost parallel to the profile wall slot 181, a second slot, the foam body auxiliary wall slot 182, is arranged. Both slot 181, 182 are joined with each other by connecting bridge 183 and build, time after time, ring-shaped foam channels around the core area 184, thus leading to the formation of the hollow chamber.

Figure 9:
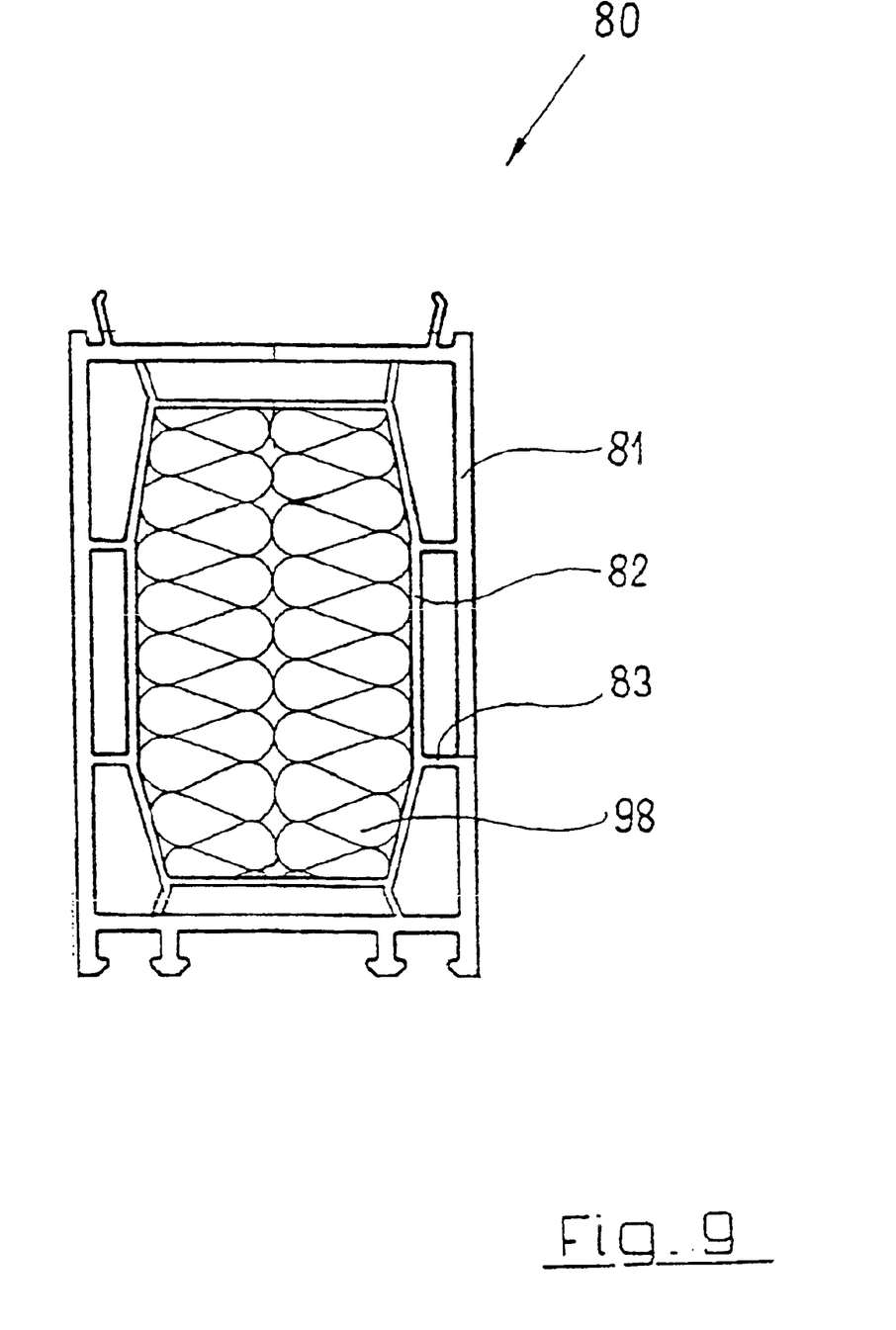
FIG. 9 is a cross-sectional view of an expandable plastic hollow profile.

The implementation form shown in FIG. 9 shows a cross-section of plastic hollow profile 80 filled with foam, produced with the profile tool 180 shown in FIG. 10 and suitable especially for the application of the foam method according to the invention.

The plastic hollow profile 80 is designed as usually required by the subsequent intended purpose for the plastic hollow profile; a special adaptation of the geometry of the profile wall 81 to the method according to invention is not necessary. The plastic hollow profile 80 consists of at least one hollow chamber, made up of at least one profile wall.

It is fundamental for the invention that the hollow chamber in the profile wall 81 is lined with a foam body auxiliary partition 82 on at least one part of its transversal circumference. The foam body auxiliary partition 82 is arranged on bridge 83, distanced from the profile partition 81. The foam body auxiliary partition 82 is less thick than the profile partition 81 and is preferably half as thick as the profile partition 81. The foam substance is directed to the hollow space lined with the foam body auxiliary partition 82 and it is here that, with the beginning of the chemical reaction, it starts expanding. In the fully filled hollow space, an inner pressure forms and exerts a force on the foam body auxiliary partition 82. Especially due to its relatively thin thickness, this can become deformed by about 1 to 2 mm, so that the pressure in the profile partition 81 decreases and the flowing in the profile partition 81 is hindered. In this way, the profile partition 81 keeps its precise size as before the injection point of the foam substance, thanks to the cooling and calibrating system. The deformation of the inside-laying foam body auxiliary wall 82 caused by the foam is not visible from outside.

The manufacturing of a plastic hollow profile 80 according to the invention especially offers the advantage that the foam substance can be injected in excess, this means that, in time, more foam substance can be injected than it would be arithmetically necessary to fill the hollow chamber at the given discharge speed. In this way, the complete filling of the hollow chamber and a regular pore formation is always guaranteed. The excessive pressure of the plastic isolating foam body 98 existing in the hollow chamber and resulting from excessive dosage, is compensated by the deformation of the foam body auxiliary wall 82 and strand 83, without affecting the external contour of the plastic hollow profile 80.

Explained below is the production of a plastic hollow profile, which, at least sometimes, is filled with foam, with the help of the extrusion devise from the invention.

The method includes at least the following steps:
- extruding of a plastic hollow profile with the formation of at least one plastic hollow profile and the extraction of the plastic hollow profile with a discharge speed VA;
- cooling of the plastic of the plastic hollow profile moving forward at discharge speed VA;
- directing of the foam lance to the hollow chamber, whereby the foam lance tip is positioned in an area of the plastic hollow profile, in which the temperature of the section of the plastic hollow profile surrounding the foam lance tip is cooled at a foam temperature TA;
- injection of a reactive mixture made up of two foaming components in the hollow chamber space with a foam substance temperature TS and foaming in a plastic isolating foam body by means of the continuous recalibration and recooling of the outer side of the plastic hollow profile.

Granulated or powered polyvinyl chloride (PVC) is conveyed to the filling funnel 306. The polyvinyl chloride is warmed up by the cylinder wall heating system of the extruder 300 and through the dissipation energy produced by the elastic sliding of the plastic mass on the worm and melted in the extruder at a mass temperature from 170° to 200° C.

Due to the rotation of the worm, the PVC melt is continuously pushed into the profile tool 100. Here it flows through the melt inlet opening 168 and is transmitted to the transmission block 120 with an angle of about 45° against the horizontal line. Subsequently, the melt flows through the melt feed channel 166 located inside the pistol shaft 102 up to the radial melt distribution channel 164. Here the melt is deviated again against the horizontal line and divided in a way that a part of the melt flows in the left extrusion direction and the other part in the right extrusion direction, around the lance guide channel 150. In an area of the radial melt distribution channel 164 lying above the lance guide channel 150, the melt single currents join together once again and enter the melt ring channel 162, stretching up to the profile nozzle 160 and located inside the one of the lance guide channel 150. The heating cushions in the tool 100 make sure that the melt from polyvinyl chloride maintains the selected temperature and that the viscosity of the melt does not rise too much.

At the exit from the profile tool 100, the plastic hollow profile is formed out of the PVC-melt at the profile nozzle 160 and comes out of the profile tool 100 at an extrusion speed Ve. The extrusion speed Ve is determined by the geometry of the worm of the extruder and of the profile tool 100 as well as by the method parameters, i.e. the worm number of revolutions and the cylinder wall temperature.

The strand of the plastic hollow profile coming out of the nozzle 160 of the profile tool 100 is directed through the cooling and calibrating systems 210, 220 and is extracted with a discharge speed VA by the transport device. The discharge speed VA is preferably equal to the output speed VE of the extruder. This can also be slightly higher so that, with the resulting stretching effect, the inflexion of the still soft hollow profile directly behind the nozzle can be prevented, and, in conjunction with the cooling and calibrating systems 210, 220, a better preservation of the size can be achieved. The discharge speed VA is about 2 m/min. According to the design of the extruded plastic hollow profile and depending on the other method parameters, this speed can range between 1 and 80 m/min.

With the selected discharge speed VA, the plastic hollow profile 50 moves through the pre-calibrating and cooling system 210 with vacuum tanks 211, 1, . . . , 211.$n$ and through the re-calibrating and cooling system 220 with calibration diaphragms 221.1, . . . , 221.$n$.

A foam lance 400 is inserted into the extruded plastic hollow profile of the type described. The foam lance 400 is inserted into the lance inlet opening 152 of the profile tool 100 and pushed through the lance drive channel 150 up to a hollow chamber of the plastic hollow profile strand coming out of the profile nozzle 160.

Under continuous temperature detection by means of temperature sensors arranged on the foam lance tip 401, the foam lance 400 is pushed so deep into the plastic hollow profile as to position the foam lance tip 401 in a place in which the temperature of the plastic hollow profile surrounding it, is reduced to the selected foam temperature. This position of the foam lance tip 401 usually lies inside the cooling and calibration system 200, as shown in FIG. 1. The great length of the section of the foam lance 400 protruding from the profile tool 100 results in flexion, so that the foam lance tip 401 lowers up to the wall of the plastic hollow profile. With the aid of the cool water flowing in the cooling and calibrating system 200, the mass temperature of the PVC plastic in the position of the foam lance tip 401 is reduced to a foam temperature TA of 25°–50°. At this temperature, the plastic is so solid that the deformation of the plastic hollow profile through the laying foam lance tip 401 is prevented.

With the aid of the foam lance 400 positioned inside the plastic hollow profile, the mixture made up of the reaction components for the production of polyurethane foam is injected in a hollow chamber of the plastic hollow profile. The mixture led in the foam lance 400 up to the foam lance tip 401, or the single components flowed up to the foam lance tip, are kept at a foam temperature TS=from 25° C. to 35° C. thanks to the water cooling the inside of the foam lance 400 before coming out of the lance.

Inside the foam lance 400, the foam substance temperature is preferably reduced down to 25° by means of the water circulation cooling, in order to prevent an early reaction of the foam mixture directly in front of the foam lance tip 401. Moreover, in order to avoid the occurrence of a reaction of the foam substance components directly next to the foam lance tip 401 and prevent it from sticking, during the profile extrusion, the distance between the tip and the foam front, obliquely forming upwards, is measured by the ultrasound sensor operating near the foam lance tip 401. At the mentioned foam substance temperature, the reaction time of the injected mix lasts 15 s. Given a discharge speed VA of 2 m.min1, the reactive foam substance mixture moves 500 mm away from the foam lance tip 401 within the space of 15 s. This distance is enough to stop the mixing head from hitting the foam lance 400.

If the required minimum distance is not reached, the foam lance 400, which is axially freely movable, could be pulled back from the rear side of the profile tool 100. This can also happen automatically by electric activation. At the same time, should a problem like the sticking of the foam lance tip 401 arise during the extrusion operation, the foam lance 400 can be completely taken out of the plastic hollow profile and profile tool 100 without having to interrupt the extrusion process or having to disassemble the tool.

The compressed air flows in shortly before the mixing head of the foam lance tip 401, through at least one compressed-air inlet and has the task to wash and cool the foam lance as well as move the existing air to a hollow chamber of a plastic hollow profile to be filled with foam. In order to cause the cooling of the wall of the hollow chamber also from inside and, in this way, achieve a faster cooling of the plastic down to the foam temperature, cooled gasses like carbon dioxide or nitrogen can also be used in place of or in addition to compressed-air.

The foam lance can be centered and held by at least one adjacent lance holding device inside the hollow chamber. Here, a magnetic field is generated around the plastic hollow profile, which positions the foam lance here directed. Here, the foam lance is provided with magnetic guiding aids along at least one part of its length.

Assisting gas, especially compressed-air, can also be flowed through a conduit of the foam lance 401 and enter through perforations of the external isolating coating of the foam lance 400. In this way, the foam lance leans on a pressure gas cushion against the inner wall of the hollow chamber. This avoids that the foam lance tip of the plastic hollow profile, overhanging due to the force of gravity, gets deformed or damaged.

The reaction components for the foaming polyurethane are isocyanates and water or carboxylic acids. Polyurethane foams result form the poly addition of water to isocyanate groups due to the scission of swelling and foam-forming carbon dioxide, according to the following reaction scheme:

R—NCO+HOM®R—NH2+CO2-

The chemical transformation of isocyanate with carboxylic acids occurs according to the following reaction scheme:

R—NCO+R'—COOH®R—CO—NH—R'+CO2-

By choosing different radicals R, R', various types of combinations can be obtained. With polyalkyleglycolate as Iolen and water as reaction components one obtains PUR soft foam; with polyoles and propellant gasses from chlorfluohudrocarbon one obtains PUR hard foam. Additionally needed auxiliary substances for the poly addition include catalysts, emulsifying agents, foam stabilizers (for example, polysiloxan-polyether-copolymers) and, if needed, fire-retardant substances.

Preferably injected as foam substances are polyoles (polyalcohol) with isocyanats. The reaction of the mixture, made up of the reaction components described, produces a polyurethane foam, which evenly fills the hollow chamber with plastic isolating foam bodies.

In order to obtain the desired number and size of pores in the hardening foam, the loading of the polyole components with 20 volume-% air bubbles has proved itself to be particularly advantageous. These are led into the hollow chamber through the foam lance, directly before the subsequent mix, with the isocyanate components and the injection of foam substance, and pushed up to the injection point, without the air bubbles being released as gas portions in the mixing system. The polyole is mixed together with the isocyanate with a 100:120 to 160 ratio, although a 100:140 parts per weight mixing ratio is preferred. The use of polyole featuring the following characteristics at 25° C., has proved itself to be particularly suitable:

- a OH-number of 300 . . . 400 mg KOH/g, preferably 350 mg KOH/g;
- a viscosity of 200 . . . 400 mpas, preferably 300 mPas;
- a density (without air load) of 1.02 to 1.08 g/cm3, preferably 1.05 g/cm3 mixed with an isocyanate having the following characteristics:

from 25 to 40% cyanate (NCO), preferably 31% NCO;
a viscosity from 160 to 260 mPas, preferably 210 mPas;
a density from 1,20 g/cm3 to 1,30 g/cm3, preferably 1,235 g/cm3

The components are mixed together directly in the lance tip through a static mixing pipe, whereby starting the polyurethane reaction. Given a mixture from the preferred components mentioned, in the said ratio, the reaction starts 10 to 20 sec. after the mixing. After about 150–240 seconds, the reaction product is adhesion-free.

The result is a CO2 carrying polyurethane hard foam with a constant pore density, and a density from 60 to 65 g/cm3, preferably 62.5 g/cm3.

The air forming in the hollow chamber during the extrusion and profiling process of the plastic hollow profile flows outwards trough the ventilation conduit 441.

The area of the plastic hollow profile filled with foam subsequently runs through the remaining stretch of the recooling and calibrating system 220, laying in front of the foam lance tip 401.

As shown in FIG. 7, with the aid of the calibration diaphragms 221.1 . . . 221.*n*, the plastic hollow profile 50 is calibrated in such a way that the corresponding slots, i.e. the smooth outer sides of the frame outer profile marked with 51 and of the frame inner profile marked with 53, can be of the required size. The frame outer profile 51 represents the subsequently visible sash and the frame inner profile 53 represents the subsequently visible view frame. The already described humidity chambers, here marked with 58, are also formed. Inside the hollow profile 50 there is a frame chamber marked with 56. The longitudinal grooves marked with 54 and 55, in the same way as for the other grooves, are calibrated accordingly, as already described, by means of the short calibration body 222. It is quite clear to see how the hollow chamber 57 rearranges itself into a plastic isolation foam body 95, thanks to cooling polyurethane foam cooling down more and more. This plastic isolation body 95 is only filled with foam; it has no connection with the polyvinyl chloride of the plastic frame profile and is gently melted by it; for example, in the recycling of the profile plastic.

The plastic isolation body 95 increases the stiffness of the plastic hollow profile. In this way, the use of inserts, especially in case of profiles for the construction of plastic window, can be avoided.

The cooled plastic hollow profile then leaves the cooling and calibration system 220 and reaches the transport device. Up to this point, the production process is continuously performed, this means that an endless plastic hollow profile is produced, with a constant extrusion speed Ve, which progressively flows through the cooling and calibrating stretches 210, 220 at a constant discharge speed VA. Also the foaming occurs through the continuous, uninterrupted injection of foam substance mixture.

The cutting interrupts the continuous flow and follows a particular pattern. The plastic hollow profiles are transversally cut with the aid of a cutting machine in order to obtain the described plastic window-frame profiles, which are subsequently sent to a stacker.

There has thus been shown and described a novel extrusion device and method for producing plastic hollow profiles which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and ether uses and applications which do not depart from the spirit and scope of the invention are deemed to be covered by the invention, which is to be limited only by the claims which follow.

What is claimed is:

1. In a method for producing plastic hollow profiles with at least one hollow chamber that is filled with foam, said method comprising:
   (1) extruding a plastic hollow profile using a profile tool at a discharge speed VA;
   (2) cooling the plastic hollow profile as it moves forward at the discharge speed VA;
   (3) directing a foam lance into the hollow chamber, with the foam lance tip positioned in an area of the plastic hollow profile, the temperature of the section of the plastic hollow profile surrounding the foam lance tip being cooled to a foam temperature TA;
   (4) injecting a reactive mixture made up of at least one foaming component into the hollow chamber with a foam substance temperature TS and foaming in a plastic isolating foam body by means of the continuous recalibration and recooling of the outer side of the plastic hollow profile;

the improvement wherein the plastic hollow profile extruded out of the profile tool is taken off on a track which is slanted downward with an angle α in the range of 1–10° with respect to the horizontal.

2. Method according to claim 1, wherein a reaction mixture is selected such that, given the temperature of the foam substance TS in the lance tip, it forms plastic foam with a reaction time in the range of 10 to 20 s.

3. Method according to claim 2, wherein the reaction mixture contains an isocyanate as first reaction component, and at least one of a polyalcohol in water and a carboxylic acid as second reaction component, and wherein the reaction mixture is foamed into one of a polyurethane foam body, a polyisocyanurate foam body and a polyurea foam body.

4. Method according to claim 3, wherein polyole and isocyanate are mixed with a ratio of 100 parts per weight polyole to 120 up to 160 parts per weight isocyanate.

5. Method according to claim 4, wherein every 100 parts per weight of polyoles are loaded with 15 to 25 volume percent air and wherein the mixture of polyole and air is mixed with 120 to 160 parts per weight isocyanate.

6. Method according to claim 1, wherein the reaction mixture is extruded from an unsaturated resin, a hardener and a propellant into a polyester resin foam body.

7. Method according to claim 1, wherein the reaction mixture is extruded from a propellant and an expandable thermoplastic into a thermoplastic foam body.

8. Method according to claim 7, wherein the thermoplastic is polystyrene.

9. Method according to claim 2, wherein the discharge speed VA is between 1 and 8 m/min.

10. Method according to claim 2, wherein the discharge speed VA is approximately equal to 2 m/min.

11. Method according to claim 2, wherein the foaming temperature TA is in the range of 25° and 50° C.

12. Method according to claim 2, wherein the foaming temperature TA is approximately equal to 30° C.

13. Method according to claim 2, wherein the foam substance temperature Ts is in the range of 15° and 25° C.

* * * * *